United States Patent
Tanaka et al.

(10) Patent No.: US 9,374,691 B2
(45) Date of Patent: Jun. 21, 2016

(54) MOBILE STATION AND INFORMATION DELIVERY SERVER

(71) Applicant: NTT DOCOMO, INC., Tokyo (JP)

(72) Inventors: Itsuma Tanaka, Tokyo (JP); Shinya Takeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/391,976

(22) PCT Filed: Apr. 10, 2013

(86) PCT No.: PCT/JP2013/060830
§ 371 (c)(1),
(2) Date: Oct. 10, 2014

(87) PCT Pub. No.: WO2013/154134
PCT Pub. Date: Oct. 17, 2013

(65) Prior Publication Data
US 2015/0080035 A1    Mar. 19, 2015

(30) Foreign Application Priority Data

Apr. 10, 2012   (JP) ................................ 2012-089771

(51) Int. Cl.
*H04W 4/00* (2009.01)
*H04W 4/14* (2009.01)
(Continued)

(52) U.S. Cl.
CPC ................ *H04W 4/14* (2013.01); *H04L 51/38* (2013.01); *H04W 48/18* (2013.01)

(58) Field of Classification Search
CPC .................................. H04W 4/12; H04W 4/14

USPC ......................................................... 455/466
See application file for complete search history.

(56) References Cited

U.S. PATENT DOCUMENTS

| 2010/0329244 A1 | 12/2010 | Buckley et al. |
| 2011/0002327 A1 | 1/2011 | Dwyer et al. |
| 2011/0188448 A1 | 8/2011 | Griot et al. |

FOREIGN PATENT DOCUMENTS

| JP | 2004-533148 A | 10/2004 |
| JP | 2009-514350 A | 4/2009 |

(Continued)

OTHER PUBLICATIONS

Nikkei Network, "Technologies that you use without realizing; Part 2: Examining Latest Authentication Technologies in High-speed Mobile Communication to NGN" ("Saishin & Teiban no Ninsho Gijutsu Part 2"), No. 114, pp. 026-033, Sep. 28, 2009 (28 pages).

(Continued)

*Primary Examiner* — Kevin Kim
(74) *Attorney, Agent, or Firm* — Osha Liang LLP

(57) ABSTRACT

Provided are a mobile station and an information delivery server that are capable of continuously providing a non-voice service, particularly a message service, even when being transitioned between areas of different radio access technologies. A UE (100) determines that an SMS over IP is in an unavailable state through communication via a radio access network. When a determination is made that the SMS over IP is in an unavailable state, even if the UE (100) is set to use the SMS over IP with higher priority than an SMS over NAS, the UE (100) uses the SMS over NAS to execute a short message service.

6 Claims, 11 Drawing Sheets

(51) Int. Cl.
*H04W 48/18* (2009.01)
*H04L 12/58* (2006.01)

(56) References Cited

FOREIGN PATENT DOCUMENTS

| WO | 02/076131 A1 | 9/2002 |
|---|---|---|
| WO | 2007/055837 A2 | 5/2007 |

OTHER PUBLICATIONS

NTT DOCOMO, "Discussion on SMS domain selection," 3GPP TSG CT WG1 Meeting #77, C1-121149, Taipei, Taiwan, Apr. 16-20, 2012 (2 pages).

3GPP TS 23.211 V11.0.0, "3rd Generation Partnership Project; Technical Specification Group Services and System Aspects; Architectural requirements (Release 11)," Dec. 2011 (51 pages).

3GPP TS 24.229 V11.3.0, "3rd Generation Partnership Project; Technical Specification Group Core Network and Terminals; IP multimedia call control protocol based on Session Initiation Protocol (SIP) and Session Description Protocol (SDP); Stage 3 (Release 11)," Mar. 2012 (728 pages).

Office Action mailed Jul. 2, 2013 in corresponding Japanese Application No. 2012-089711 (8 pages).

Office Action mailed Oct. 1, 2013 in corresponding Japanese Application No. 2012-089711 (5 pages).

International Search Report issued in PCT/JP2013/060830, mailed Jul. 2, 2013 (4 pages).

Written Opinion issued in PCT/JP2013/060830, mailed Jul. 2, 2013 (14 pages).

Notice of Grounds for Rejection issued in the counterpart Korean Patent Application No. 10-2014-7028883, mailed Oct. 8, 2015 (7 pages).

Extended European Search Report issued in the counterpart European Patent Application No. 13775415.6, mailed Nov. 16, 2015 (6 pages).

3GPP TS 24.301 V11.2.0; "3rd Generation Partnership Project; Technical Specification Group Core Network and Terminals; Non-Access-Stratum (NAS) protocol for Evolved Packet System (EPS); Stage 3 (Release 11)"; Mar. 2012 (327 pages).

(a)

(b)

(a)

(b)

MOBILE STATION AND INFORMATION DELIVERY SERVER

TECHNICAL FIELD

The present invention relates to a mobile station and an information delivery server that provide non-voice (including video telephones) services executed on the Internet protocol.

BACKGROUND ART

Examples of non-voice services provided through a mobile communication network include a "non-voice service over NAS" that receives a service provided from a server using a control signal through a 2G (GERAN)/3G (UTRAN) core network, and a "non-voice service over IP" that receives a service provided from a server through an IMS on an IP basis. FIG. 11 illustrates a schematic configuration diagram of a network that provides non-voice services. Message services among the non-voice services particularly include unstructured supplementary service data (USSD) mainly provided by a GSM (registered trademark), a short message service (SMS) specified in the 3rd generation partnership project (3GPP), and the like.

The message service with the USSD and the short message service (SMS) are used as text communications between terminals (mobile stations and the like). In addition, the USSD is used in an application program for performing text chat, and is also used for an additional service setting control on a text basis. The USSD is broadly divided into two types of a "USSD over IP" and a "USSD over NAS". FIG. 12 illustrates a schematic configuration example of such USSDs.

The SMS provided by the 3GPP is broadly divided into two types of an "SMS over IP" and an "SMS over NAS". FIG. 1 illustrates a schematic configuration example of such SMSs.

As illustrated in FIG. 1, the "SMS over NAS" is available in the 2G (GERAN)/3G (UTRAN) and an LTE (E-UTRAN), and includes three types of an SMS over SGs, an SMS over CS, and an SMS over PS. Moreover, the "SMS over IP" is available only in the LTE (E-UTRAN).

Moreover, the 3GPP specifies that whether the SMS over IP is used with higher priority, or the SMS over IP is not used, in other words, the SMS over NAS is used can be set for a mobile station in advance (for example, NON-PATENT DOCUMENT 1).

PRIOR ART DOCUMENT

Non-Patent Document

Non-patent document 1: 3GPP TS 23.221 V11.0.0 3rd Generation Partnership Project; Technical Specification Group Services and System Aspects; Architectural requirements (Release 11), December 2012

SUMMARY OF THE INVENTION

However, the abovementioned content specified in the conventional 3GPP has such a problem below. In other words, there is a problem in that only one common setting can be made as to whether the SMS over IP is used with higher priority, independent of the radio access technologies (RAT).

Specifically, since a bearer that uses a session initiation protocol (SIP) cannot be provided in the 2G/3G depending on the functions of the radio access network does not allow, the SMS over IP may be unavailable. In such an instance, when the mobile station is set to use the SMS over IP with higher priority, there is a problem in that if a connection destination of the mobile station is switched from the LTE to the 2G/3G, the SMS cannot be provided.

In addition, even if an SMS to be used can be specified for every radio access technology (RAT), there is a problem in that the SMS cannot be provided for a long period of time. This is because the mobile station maintains a registration state to an IMS after the switching before a timer expires, so that an SMS cannot be provided even with an SMS over SGs (see FIG. 1) before the timer expires and the registration state to the IMS is resolved. These problems similarly occur in the USSD.

The present invention has been made in view of such circumstances and an objective thereof is to provide a mobile station and an information delivery server that are capable of continuously providing a non-voice service, particularly a message service (including a case where the present invention is applied to an additional service setting control), even when being transitioned between areas of different radio access technologies.

A first feature of the present invention is summarized as a mobile station (UE 100) capable of using a first message service (SMS over IP/USSD over IP) that is a message service executed on an Internet protocol, and a second message service (SMS over NAS/USSD over NAS) that is a message service executed in accordance with a protocol other than the Internet protocol, via a radio access network (3G/LTE), the mobile station (UE 100) including: a state determination unit (a state determination unit 101) configured to determine that the first message service is in an unavailable state through communication via the radio access network; and a service execution unit (a service execution unit 115) configured to use the second message service to execute the short message service when the state determination unit determines that the first message service is in the unavailable state, and even when the first message service is set to be used with higher priority than the second message service.

A second feature of the present invention is summarized as a mobile station capable of using a first message service that is a message service executed on an Internet protocol, and a second message service that is a message service executed in accordance with a protocol other than the Internet protocol, via a plurality of radio access networks of different communication schemes, the mobile station including: an information holding unit (an information holding unit 111) configured to hold setting information in which each of the radio access networks is associated with either one of the first message service and the second message service; and a service execution unit (a service execution unit 115) configured to execute the message service by using one of the first message service and the second message service, that is associated with the connected radio access network, on the basis of the setting information held by the information holding unit.

A third feature of the present invention is summarized as an information delivery server (an information delivery server 400) that provides information to a mobile station capable of using a first message service that is a message service executed on an Internet protocol, and a second message service that is a message service executed in accordance with a protocol other than the Internet protocol, via a plurality of radio access networks of different communication schemes, the information delivery server including an information providing unit (an information providing unit 403) configured to transmit setting information in which each of the radio access networks is associated with either one of the first message service and the second message service, to the mobile station.

MODE FOR CARRYING OUT THE INVENTION

Next, an embodiment of the present invention will be described. Note that, in the following description of the drawings, same or similar reference signs denote same or similar elements and portions. In addition, it should be noted that the drawings are schematic and ratios of dimensions and the like are different from actual ones.

Therefore, specific dimensions and the like should be determined in consideration of the following description. Moreover, the drawings also include portions having different dimensional relationships and ratios from each other.

Figure 1:
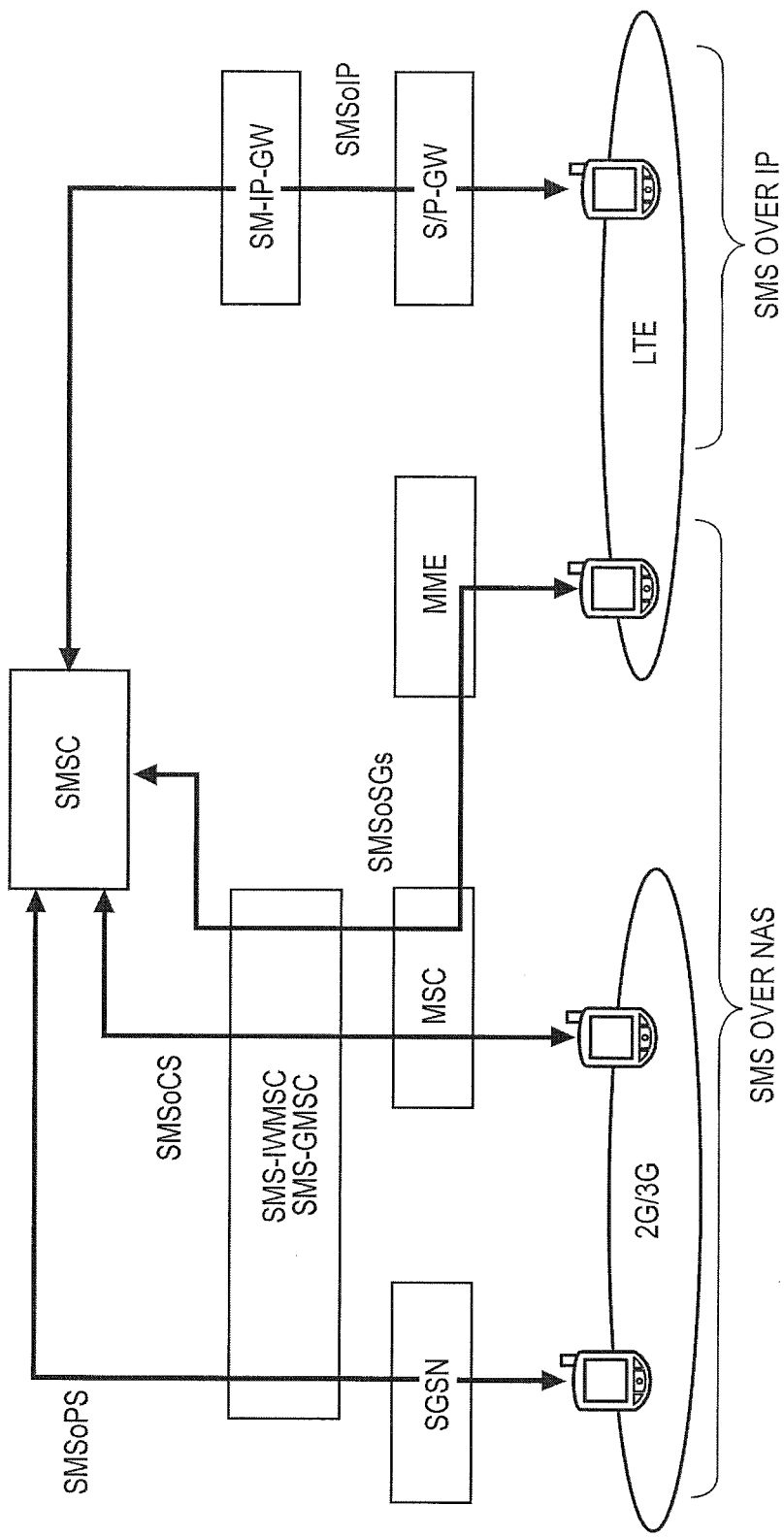
FIG. 1 is a diagram illustrating a schematic configuration example of a conventional short message service (SMS).
Figure 2:
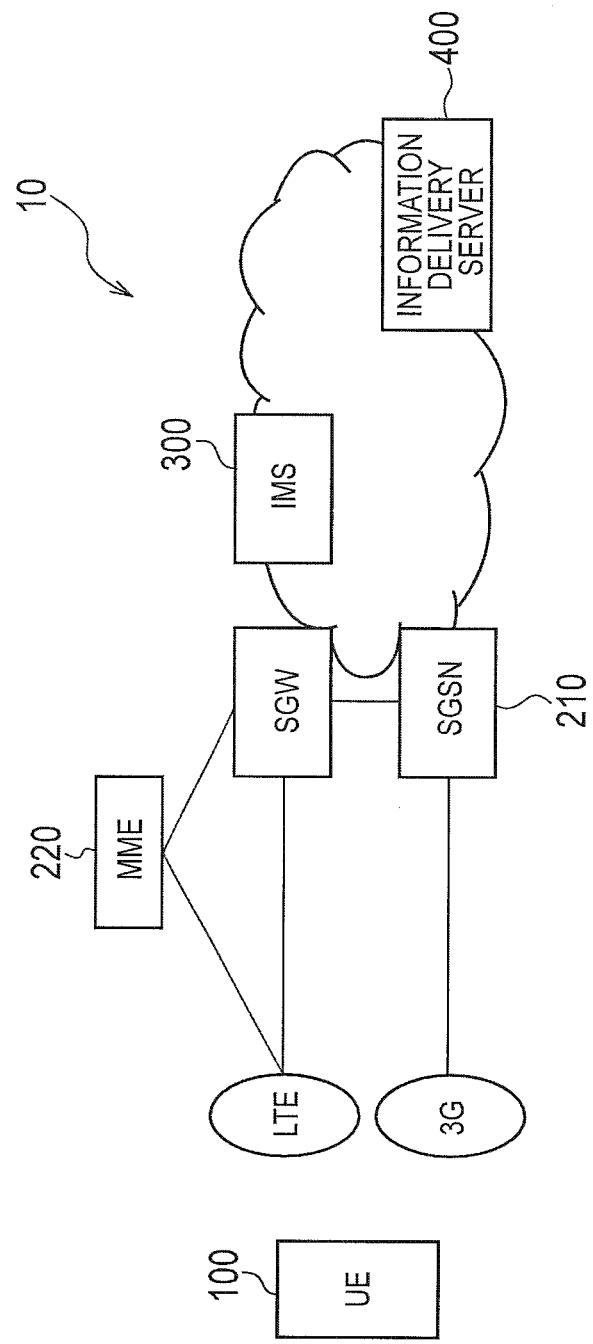
FIG. 2 is an overall schematic configuration diagram of a mobile communication system 10 according to embodiments of the present invention.

First Embodiment (1) Overall Schematic Configuration of Mobile Communication System FIG. 2 is an overall schematic configuration diagram of a mobile communication system 10 according to a present embodiment. As illustrated in FIG. 2, the mobile communication system 10 includes a mobile station 100 (hereinafter, UE 100), a mobility management entity 200 (hereinafter, MME 200), a serving GPRS support node (hereinafter, SGSN 210), and an IP multimedia core network subsystem 300 (IMS 300). Moreover, the mobile communication system 10 includes multiple radio access networks, specifically, 3G (U-TRAN) and LTE (E-UTRAN), and Serving Gateway (SGW) radio access networks. Note that, although only devices and networks that relate to the present invention are illustrated in FIG. 2, the mobile communication system 10 includes other devices (for example, a Packet Data Network Gateway (PGW), a Policy and Charging Rules Function (PCRF), and the like).

The UE 100 can execute radio communication in accordance with the Long Term Evolution (LTE) and 3G (W-CDMA) schemes. In particular, in the present embodiment, the UE 100 can use multiple short message services (SMSs), specifically, an SMS over IP and an SMS over NAS, via the radio access network.

The SMS over IP is a short message service (first message service) executed on an Internet protocol. Moreover, the SMS over NAS is a short message service (second message service) executed in accordance with a protocol other than the Internet protocol. Moreover, in the present embodiment, the UE 100 is set so as to use the SMS over IP with higher priority than the SMS over NAS.

The MME 200 is a switch that manages an eNodeB (radio base station), and provides a mobility control function and a bearer control function. The SGSN 210 is a packet switch that manages a 3G (UTRAN) access system.

The IMS 300 is a multimedia subsystem in accordance with the Internet protocol, and includes a Proxy-Call Session Control Function (P-CSCF), an Interrogating-Call Session Control Function (I-CSCF), a Serving-Call Session Control Function (S-CSCF), an Application Server (AS) (which are not illustrated), and the like.

(2) Functional Block Configuration of Mobile Station

Figure 3:
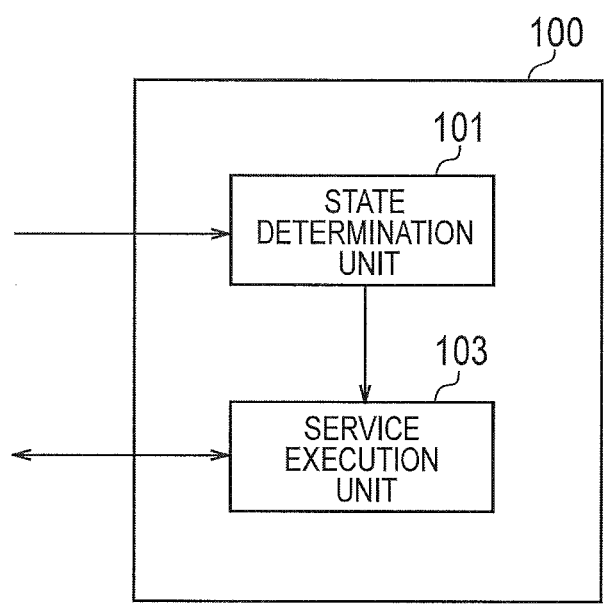
FIG. 3 is a functional block configuration diagram of a UE 100 according to a first embodiment of the present invention.

FIG. 3 is a functional block configuration diagram of the UE 100. As illustrated in FIG. 3, the UE 100 includes a state determination unit 101 and a service execution unit 103.

The state determination unit 101 determines that the SMS over IP is in an unavailable state through communication via a radio access network. Specifically, when receiving non-support information indicating that a voice communication service by the IMS 300 is not supported, via the radio access network, that is, IMS Voice over PS=not supported, the state determination unit 101 determines that the SMS over IP is in an unavailable state.

When a SIP bearer is rejected to be set because the IMS 300 is unavailable, the state determination unit 101 may determine that the SMS over IP is in an unavailable state. In addition, when a SIP bearer to be submitted is rejected because the SMS over IP is unavailable, the state determination unit 101 also can determine the SMS over IP is in an unavailable state.

Moreover, when no SIP bearer that is a logical communication path established by the SIP and is used for a submission request is present, the state determination unit 101 also can determine that the SMS over IP is in an unavailable state.

When the state determination unit 101 determines that the SMS over IP is in an unavailable state, even if the SMS over IP is set to be used with higher priority than the SMS over NAS, the service execution unit 103 executes a short message service by using the SMS over NAS.

Specifically, the service execution unit 103 requests to set a SIP bearer that is a logical communication path established by a SIP via the radio access network in order to use the SMS over IP. Moreover, the service execution unit 103 also can send a request to submit a SIP bearer in accordance with a SIP operating on the Internet protocol via the radio access network in order to use the SMS over IP.

(3) Operation of Mobile Station

Next, an operation of the abovementioned mobile station (UE 100) is described. Specifically, an execution operation of a short message service by the UE 100 is described. FIG. 4 to FIG. 7 illustrate execution operation examples of the short message service by the UE 100.

(3.1) Operation Example 1

Figure 4:
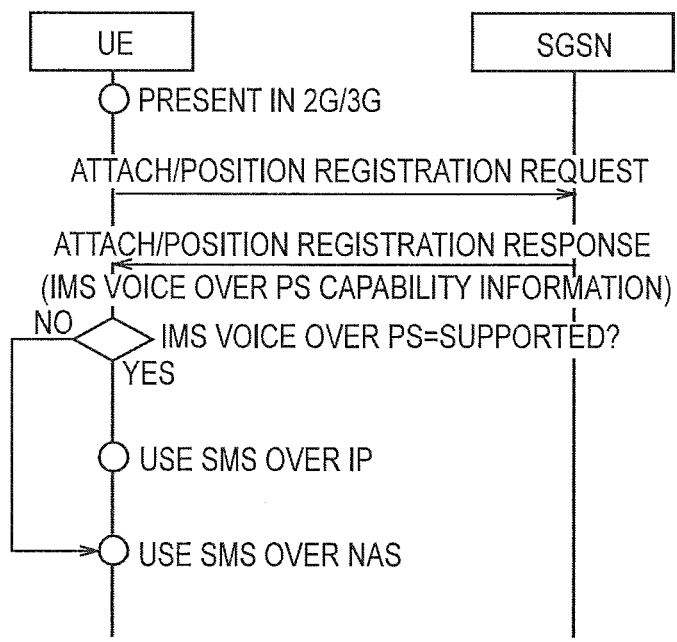
FIG. 4 is a diagram illustrating an execution operation example (operation example 1) of a short message service by the UE 100 according to the first embodiment of the present invention.
Figure 4:
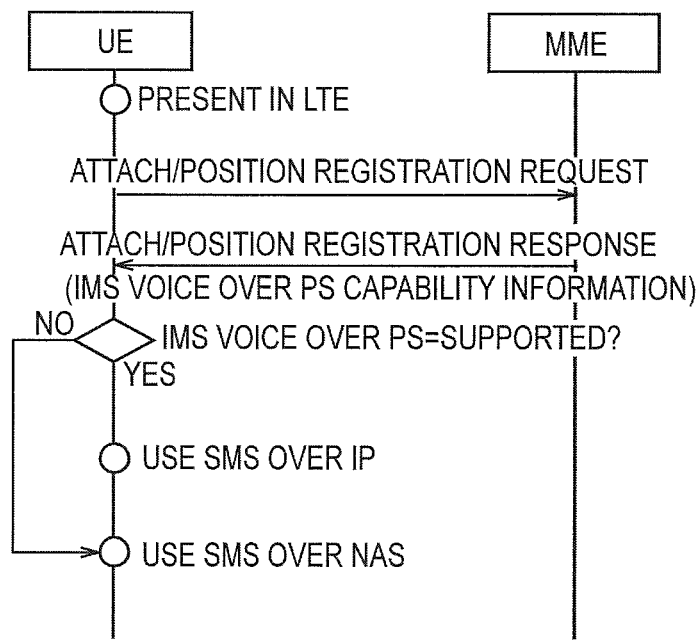

FIG. 4(*a*) illustrates an operation when the UE 100 is present in the 3G, and FIG. 4(*b*) illustrates an operation when the UE 100 is present in the LTE. As illustrated in FIGS. 4(*a*) and 4(*b*), when the UE 100 is set to give a high priority to the SMS over IP, if the SGSN 210 or the MME 200 notifies the UE 100 of "IMS Voice over PS=not supported" at Attach or position registration in the 3G/LTE, the UE 100 uses the SMS over NAS, not the SMS over IP.

On the other hand, if the SGSN 210 or the MME 200 notifies the UE 100 of "IMS Voice over PS=supported" at the Attach or position registration in the 3G/LTE, the UE 100 uses the SMS over IP.

(3.2) Operation Example 2

Figure 5:
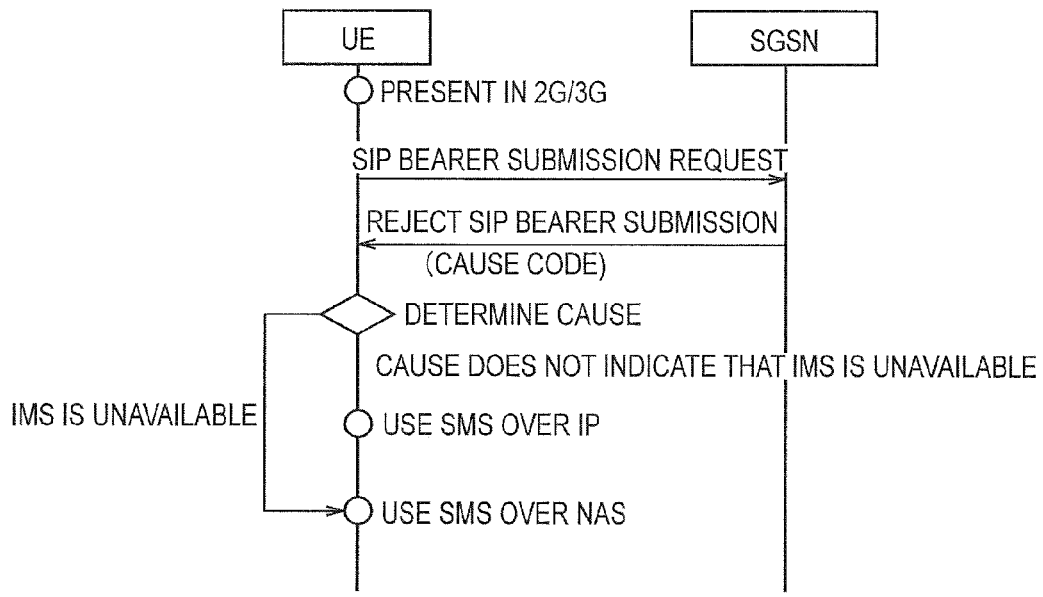
FIG. 5 is a diagram illustrating an execution operation example (operation example 2) of a short message service by the UE 100 according to the first embodiment of the present invention.
Figure 5:
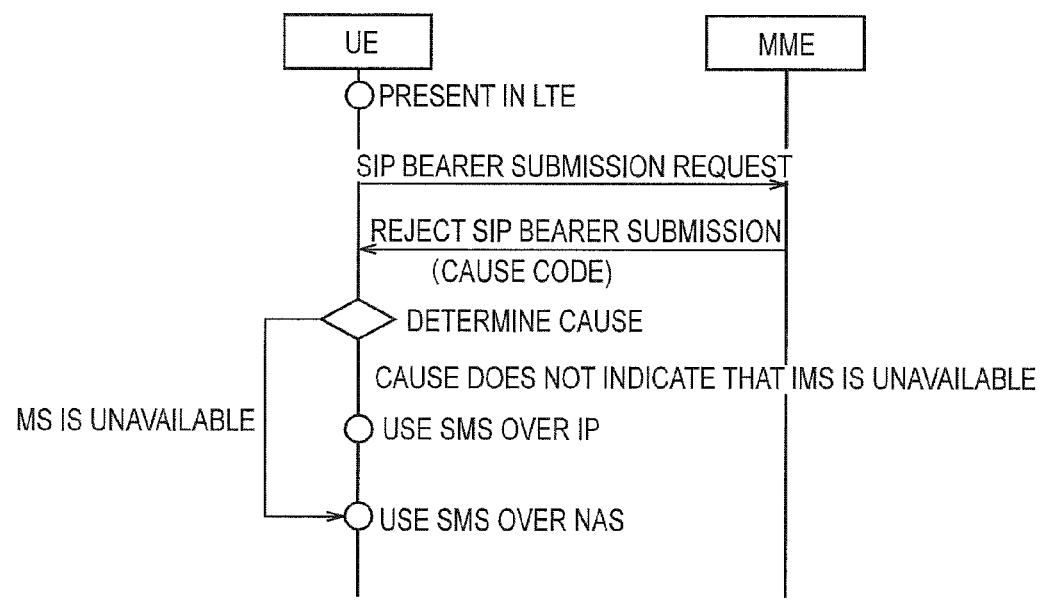

FIG. 5(*a*) illustrates an operation when the UE 100 is present in the 3G, and FIG. 5(*b*) illustrates an operation when the UE 100 is present in the LTE. As illustrated in FIGS. 5(*a*) and 5(*b*), when the UE 100 is set to give a high priority to the SMS over IP, if the UE 100 thereafter executes submission of a SIP bearer in order to use the SMS over IP, and the submission request is rejected by a cause value indicating that "IMS is unavailable", the UE 100 uses the SMS over NAS, not the SMS over IP.

Note that, the cause may be #32 (Service option not supported) or the like, or may be other causes indicating that the IMS 300 is unavailable.

(3.3) Operation Example 3

Figure 6:
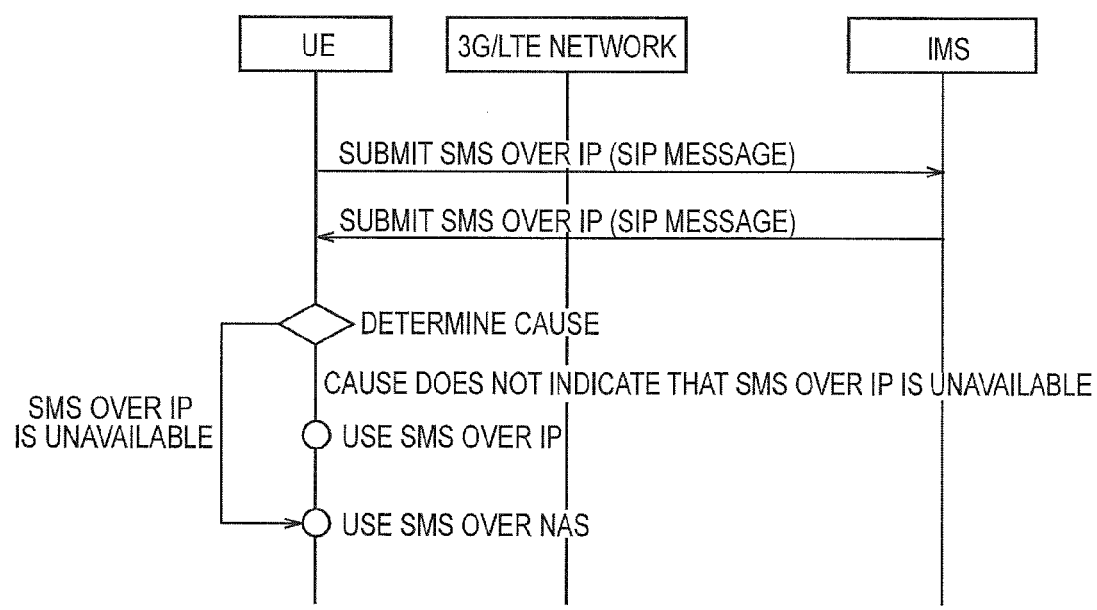
FIG. 6 is a diagram illustrating an execution operation example (operation example 3) of a short message service by the UE 100 according to the first embodiment of the present invention.

As illustrated in FIG. 6, when the UE 100 is set to give a high priority to the SMS over IP, if the UE 100 executes submission of an SMS that uses the SMS over IP (SIP MESSAGE procedure), and the submission is rejected by a cause indicating that a particular SMS over IP is unavailable, the UE 100 uses the SMS over NAS, not the SMS over IP. Examples of a response to be rejected include the status code of a numerical value 503 (Service Unavailable) or 603 (Decline), or a response indicating that the service is permanently unavailable.

(3.4) Operation Example 4

Figure 7:
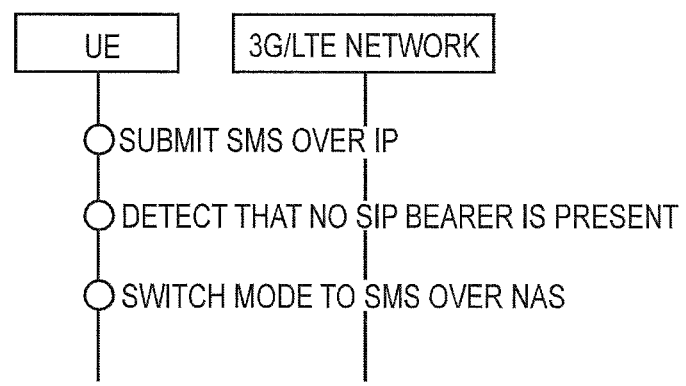
FIG. 7 is a diagram illustrating an execution operation example (operation example 4) of a short message service by the UE 100 according to the first embodiment of the present invention.

As illustrated in FIG. 7, when the UE 100 is set to give a high priority to the SMS over IP, although the UE 100 intends to execute submission of an SMS (SIP MESSAGE procedure) that uses the SMS over IP, if no SIP bearer is present, the UE 100 automatically switches to the SMS over NAS, not the SMS over IP.

Second Embodiment

Next, a second embodiment of the present invention is described. Hereinafter, portions different from those in the abovementioned first embodiment are mainly described. In the present embodiment, setting information relating to a short message service is transmitted to the UE 100 using an information delivery server 400 (see FIG. 2).

The information delivery server 400 provides various kinds of information with respect to the UE 100. In particular, in the present embodiment, the information delivery server 400 transmits setting information in which each radio access network is associated with the SMS over IP or the SMS over NAS, to the UE 100.

Figure 8:
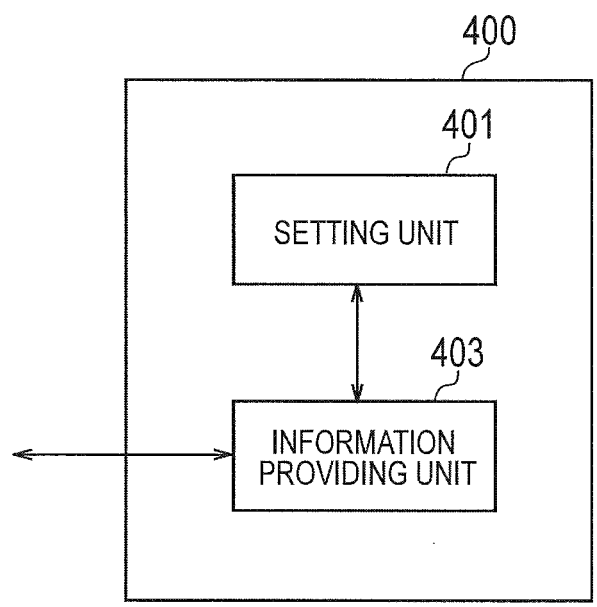
FIG. 8 is a functional block configuration diagram of an information delivery server 400 according to a second embodiment of the present invention.
Figure 9:
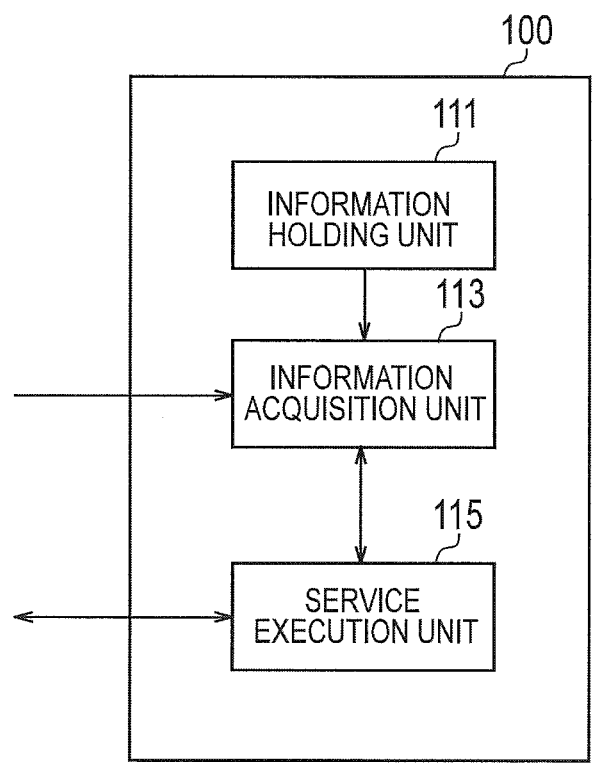
FIG. 9 is a functional block configuration diagram of a UE 100 according to the second embodiment of the present invention.

(1) Functional Block Configuration of Mobile Station and Information Delivery Server FIG. 8 is a functional block configuration diagram of the information delivery server 400. Moreover, FIG. 9 is a functional block configuration diagram of a mobile station (UE 100) according to the present embodiment.

As illustrated in FIG. 8, the information delivery server 400 includes a setting unit 401 and an information providing unit 403.

The setting unit 401 creates setting information in which each radio access network is associated with the SMS over IP or the SMS over NAS.

The information providing unit 403 transmits the setting information created by the setting unit 401 to the UE 100. The information providing unit 403 preferably notifies the UE 100 of the setting information in advance. As for a notification means for the setting information, for example, a means such as an OMA-DM can be used.

As illustrated in FIG. 9, the UE 100 according to the present embodiment includes an information holding unit 111, an information acquisition unit 113, and a service execution unit 115.

The information holding unit 111 holds setting information transmitted from the information delivery server 400. Specifically, the information holding unit 111 holds setting information acquired by the information acquisition unit 113. In other words, the information holding unit 111 holds setting information in which each radio access network is associated with the SMS over IP or the SMS over NAS.

Alternatively, the information holding unit 111 may hold setting information inputted when the UE 100 is manufactured.

The information acquisition unit 113 acquires setting information via any of the radio access networks or other communication network (for example, radio LAN) from the information delivery server 400.

The service execution unit 115 executes a short message service by using either the SMS over IP or the SMS over NAS that is associated with the radio access network to which the UE 100 is connected, on the basis of the setting information held by the information holding unit 111.

(2) Operation of Mobile Station and Information Delivery Server

Figure 10:
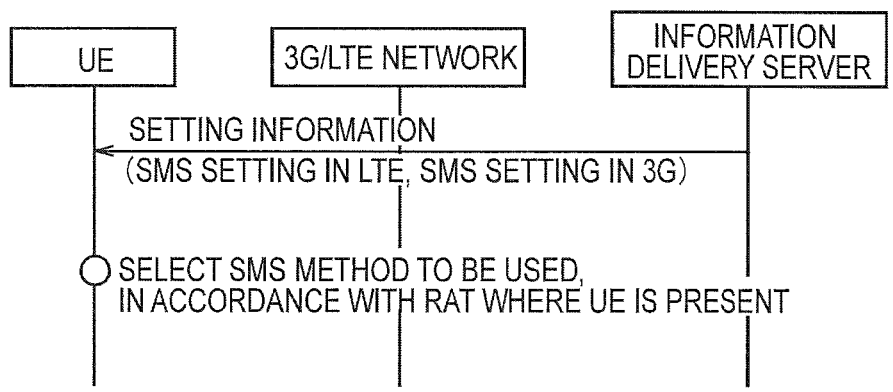
FIG. 10 is a diagram illustrating an execution operation example of a short message service by the UE 100 and the information delivery server 400 according to the second embodiment of the present invention.
Figure 11:
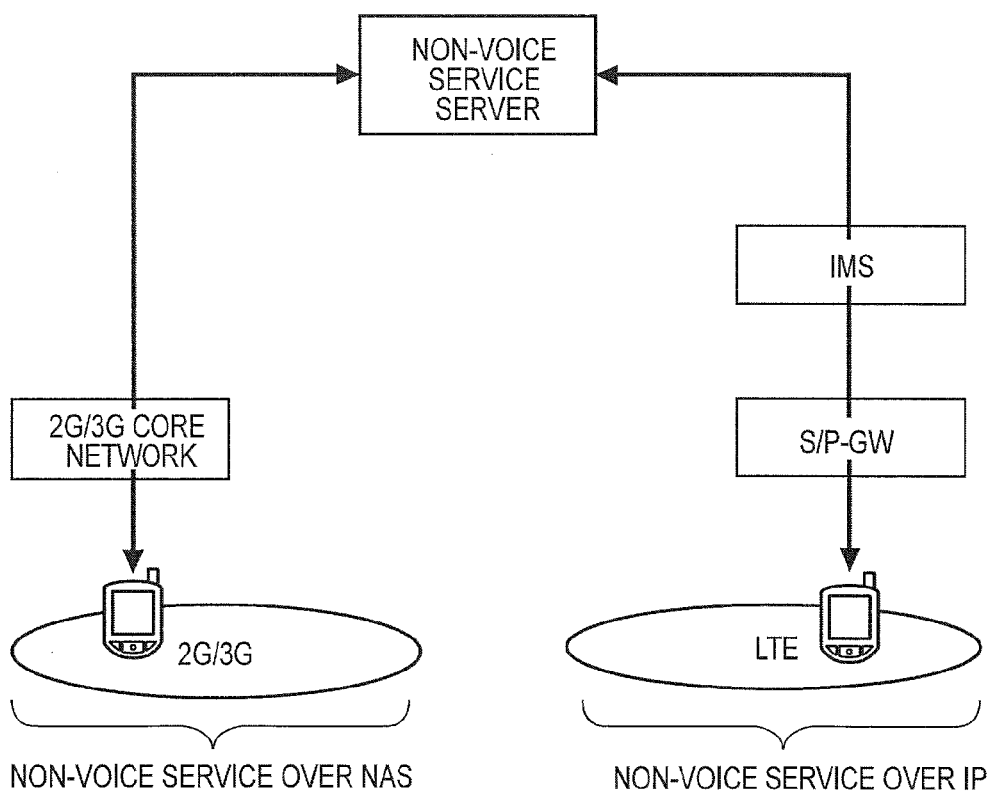
FIG. 11 is a diagram illustrating a schematic configuration example of a conventional non-voice service.
Figure 12:
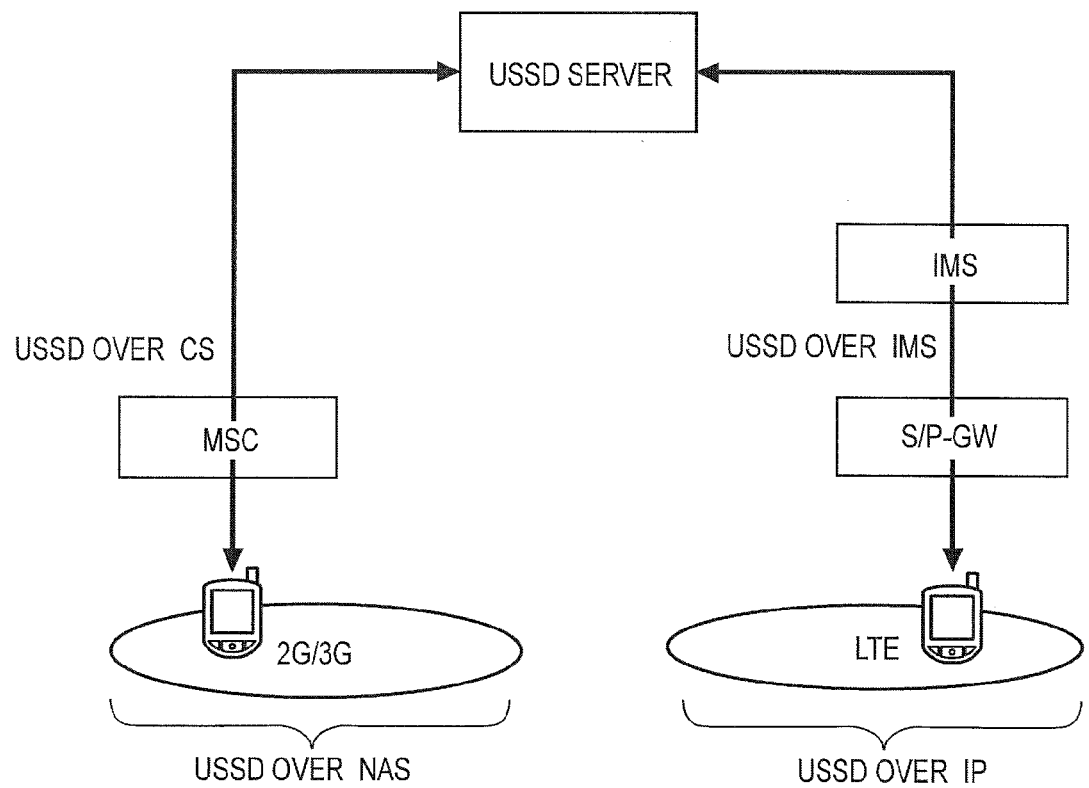
FIG. 12 is a diagram illustrating a schematic configuration example of a conventional USSD.

FIG. 10 illustrates an execution operation example of a short message service by the UE 100 and the information delivery server 400 according to the present embodiment.

As illustrated in FIG. 10, the information delivery server 400 transmits setting information in which each of the radio access networks (3G and LTE) is associated with the SMS over IP or the SMS over NAS, to the UE 100. For example, the 3G and the SMS over NAS are associated with each other, and the LTE and the SMS over IP are associated with each other. In other words, an SMS method that the UE 100 uses is set for each of the 3G and the LTE.

The UE 100 refers to the received setting information, and selects an SMS method (SMS over IP or SMS over NAS) to be used in accordance with the radio access network (RAT) where the UE 100 is present.

Operation and Effect

With the mobile communication system 10 according to the abovementioned first embodiment, even when the UE 100 (state determination unit 101) determines that the SMS over IP is in an unavailable state, and is set to use the SMS over IP with higher priority than the SMS over NAS, a short message service can be executed using the SMS over NAS.

Moreover, with the mobile communication system 10 according to the abovementioned second embodiment, setting information in which each radio access network is associated with the SMS over IP or the SMS over NAS is transmitted to the UE 100.

This prevents a short message service from being in an unavailable state for a long period of time different from the conventional case even when the UE 100 is transitioned (handover, or the like) between areas of different radio access technologies, thereby allowing the short message service to be continuously provided.

Other Embodiments

Although the abovementioned embodiments describe the short message service specified in the 3GPP as a message service, the same almost applies to the USSD. In other words, the present invention is applied to a network that can use a USSD over IP and a USSD over NAS to allow the USSD over IP or the USSD over NAS to be appropriately used, and a message service or an additional service setting control (USSD) to be continuously available. In particular, the additional service setting control to which the USSD is applied is performed through communication on a text basis, and is an operation approximately similar to the aforementioned message service. Therefore, the aforementioned message service can be read as the additional service setting control. As described above, the details of the present invention have been disclosed by using the embodiment of the present invention. However, it should not be understood that the description and drawings which constitute part of this disclosure limit the present invention. From this disclosure, various alternative embodiments, examples, and operation techniques will be easily found by those skilled in the art.

For example, although the 3G and the LTE are described as examples in the abovementioned embodiments of the present invention, for example, a 2G (GERAN) may be used as an alternative to the 3G.

As described above, the present invention naturally includes various embodiments which are not described herein. Accordingly, the technical scope of the present invention should be determined only by the matters to define the invention in the scope of claims regarded as appropriate based on the description.

Note that the entire content of Japanese Patent Application No. 2012-089771 (filed on Apr. 10, 2012) is incorporated by reference in the present specification.

INDUSTRIAL APPLICABILITY

With the characteristics of the present invention, the mobile station and the information delivery server that can continuously provide a non-voice service, particularly a message service, even when being transitioned between areas of different radio access technologies, can be provided.

EXPLANATION OF THE REFERENCE NUMERALS 10 mobile communication system
100 UE
101 state determination unit
103 service execution unit
111 information holding unit
113 information acquisition unit
115 service execution unit
200 MME
210 SGSN
300 IMS
400 information delivery server
401 setting unit
403 information providing unit

The invention claimed is:

1. A mobile station capable of using a first message service that is a message service executed on an Internet protocol, and a second message service that is a message service executed in accordance with a protocol other than the Internet protocol, via a radio access network, the mobile station comprising:
a state determination unit configured to determine that the first message service is in an unavailable state through communication via the radio access network; and
a service execution unit configured to use the second message service to execute the message service when the state determination unit determines that the first message service is in the unavailable state, and even when the first message service is set to be used with higher priority than the second message service, wherein
the service execution unit requests submission in accordance with a session initiation protocol operating on the Internet protocol via the radio access network in order to use the first message service,
the service execution unit requests to set a bearer that is a logical communication path established by a session initiation protocol operating on the Internet protocol via the radio access network in order to use the first message service,
the state determination unit determines that the first message service is in the unavailable state when the bearer that is the logical communication path established by the session initiation protocol operating on the Internet protocol and is used for the request of the submission is not present at the submission, and
the state determination unit determines that the first message service is in the unavailable state when the setting of the bearer is rejected because an IP multimedia subsystem in accordance with the Internet protocol is unavailable.

2. The mobile station according to claim 1, wherein the state determination unit determines that the first message service is in the unavailable state when receiving non-support information indicating that no voice communication service by an IP multimedia subsystem in accordance with the Internet protocol is supported, via the radio access network.

3. The mobile station according to claim 1, wherein the first message service that is the message service executed on the Internet protocol, and the second message service that is the message service executed in accordance with the protocol other than the Internet protocol are text communication or additional service control on a text basis.

4. The mobile station according to claim 1, wherein the service execution unit automatically switches to the second message eservice, not the first message service when the state determination unit determines that the bearer is not present.

5. The mobile station according to claim 1, wherein the first and second message services are unstructured supplementary service data (USSD).

6. The mobile station according to claim 1, wherein the first and second message services are Short Message Service (SMS).

* * * * *